US007151780B1

(12) United States Patent
Belscher et al.

(10) Patent No.: US 7,151,780 B1
(45) Date of Patent: Dec. 19, 2006

(54) ARRANGEMENT FOR AUTOMATED TELLER MACHINE COMMUNICATIONS BASED ON BISYNC TO IP CONVERSION

(75) Inventors: Michael Belscher, Cary, NC (US); Ricardo Cobb, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 10/090,776

(22) Filed: Mar. 6, 2002

(51) Int. Cl.
*H04J 3/22* (2006.01)
*G06Q 40/00* (2006.01)

(52) U.S. Cl. ........................................ 370/466; 705/43
(58) Field of Classification Search ........ 370/464–467; 705/43; 902/8
See application file for complete search history.

(56) References Cited

U.S. PATENT DOCUMENTS

| | | | | |
|---|---|---|---|---|
| 5,341,376 | A | * | 8/1994 | Yamashita ................... 370/466 |
| 5,793,307 | A | * | 8/1998 | Perreault et al. .......... 340/825.5 |
| 5,859,848 | A | * | 1/1999 | Miura et al. ............ 370/395.31 |
| 6,111,893 | A | * | 8/2000 | Volftsun et al. ............. 370/466 |
| 6,965,879 | B1 | * | 11/2005 | Richards et al. ............... 705/43 |
| 2001/0030976 | A1 | * | 10/2001 | Turner ......................... 370/474 |
| 2001/0033580 | A1 | * | 10/2001 | Dorsey et al. ............... 370/466 |

OTHER PUBLICATIONS

Compaq, "A proven, integrated EFT solution from ACI Worldwide and Compaq", *BASE₂₄Finance Industry Solution Brief,* Sep. 2000, Compaq Computer Corporation.

ACI Worldwide, "Base24-atm", Products Detail, Jan. 29, 2002.
Compaq, "Base24-ATM", Compaq Solutions, Jan. 29, 2002.
"Bridging and IBM Networking Overview", Nov. 14, 2000, BC1-BC-55.

* cited by examiner

*Primary Examiner*—Chau Nguyen
*Assistant Examiner*—Kerri Dyke
(74) *Attorney, Agent, or Firm*—Leon R. Turkevich

(57) ABSTRACT

A novel translation is used to enable the transport of bisync information from an automated teller machine (ATM) to a host computer via an Internet Protocol network, without the necessity of providing a serial data stream to a host server for transport of bisync information. A router includes a serial interface configured for receiving a bisync serial data stream carrying Base-24 protocol data from the ATM. The router is configured for retrieving the Base-24 data from the bisync serial stream, and generating a new header that specifies attributes of the Base-24 message from the ATM; the Base-24 message and the corresponding new header are sent by the router to the host server according to Internet Protocol, enabling the host server to receive the Base-24 message and any associated status information based on the corresponding supplied header. The router also is configured for receiving via the data network an IP packet having a Base-24 message generated by the host server, and the associated header, and generating a bisync header based on the received header. The router can then output a new bisync frame having the generated bisync header and the Base-24 message generated by the host server, for the local ATM via the serial connection.

40 Claims, 4 Drawing Sheets

ARRANGEMENT FOR AUTOMATED TELLER MACHINE COMMUNICATIONS BASED ON BISYNC TO IP CONVERSION

BACKGROUND OF THE INVENTION

1. Field of the Invention

The present invention relates to communications of Base-24 protocol messages between a host server and an automated teller machine (ATM) via an Internet Protocol (IP) network.

2. Description of the Related Art

Automated teller machines (ATMs) have been configured for communicating with host servers using Base-24 protocol via a serial tunneling connection, referred to as bisync tunneling (BSTUN). In particular, an ATM is configured for generating Base-24 data; the Base-24 data is encapsulated into a bisync frame, according to bisync (BSC) data link protocol, that is sent over a serial connection to a host server. Hence, each ATM has a corresponding serial connection to the host server. For transport of serial data from remote ATMs, the BSC data link protocol enables enterprises to transport bisync traffic over the same network that supports their SNA and multi-protocol traffic, eliminating the need for separate BSC wide area network facilities.

FIG. 1 is a block diagram illustrating a conventional (prior art) network configured for transporting bisync traffic between an ATM 12 and a host server 14. The system 10 includes an access router 16a, also referred to as a "tail-end" router, and a headend router 16b. The tail-end router 16a and the headend router 16b include bisync tunneling (BSTUN) resources 18 that enable the transport of bisync traffic across an IP network 20, for example the Internet or a private TCP/IP based wide area network.

In particular, the BSTUN resource 18a is configured for encapsulating the bisync traffic received from the serial connection 17a into IP frames, and outputting the IP frames to the headend router 16b via the IP network 20. The BSTUN resource 18b receives the IP frames from the network 20, removes the IP headers, and presents the bisync traffic from the ATM 12 to the bisync host 14 via a corresponding serial connection assigned for that ATM 12, for example the serial link 17b. Note that alternative encapsulation methods may be used, for example High Level Data Link Control (HDLC) protocol may be used as an alternative encapsulation method for point to point links; frame relay is another alternative encapsulation method when transporting over frame relay circuits where IP routing is not necessary (e.g., where both the tail-end router 16a and the headend router 16b are directly attached to a frame relay network instead of the IP network 20).

The BSTUN resources 18 support point-to-point, multi-drop and virtual multi-drop BSC connections. In point-to-point BSTUN passthrough operation, the bisync traffic between the two point-to-point devices (e.g., the ATM 12 and the host server 14) are received and forwarded transparently by the BSTUN resources 18. The procedures for establishing a transmission link between the end devices 12, 14 are handled by the end devices themselves, with data and control frames encapsulated with a BSTUN header and forwarded, and the peer router removing the header and forwarding the bisync data to the proper serial port 17. In particular, each BSTUN resource 18 includes a TCP/IP encapsulation resource 21 for encapsulation of the bisync frame and transfer to the peer resource 21 via a TCP/IP tunnel, a direct connect resource 23, and/or a frame relay encapsulation resource 25 for encapsulation of the bisync frame and transfer to the peer resource 25 via a frame relay connection.

In cases where bisync local acknowledgment (BSC LACK) is needed, the routers 16 include bisync resources 19. The bisync resource 19b implemented within the headend router 16b includes a pollee state machine 24 to simulate a secondary end device (e.g., an ATM) responding to polls from the host server 14. The bisync resource 19a implemented within the tail-end router 16a includes a poller state machine 26 to perform the primary polling operations (e.g., simulating the host server 14) by sending poll requests to the ATM 12. Hence, in the case of BSC local acknowledgment, only the data frames are encapsulated with a BSTUN header and forwarded by the router 16. Management of control unit (CU) states between the poller and pollee are managed by a bisync local acknowledgment application programming interface (BSC LACK API) 28, which adds a BSC LACK header before sending packets to the BSTUN resource 18. An SNMP agent (not shown) is used for tunnel state changes in the IP tunnel between the routers 16.

A fundamental problem with the arrangement of FIG. 1 is that the disclosed implementation of transporting bisync traffic across a network using BSTUN is based on the design assumption that all devices (e.g., the ATM 12) that send and receive bisync protocol data frames are serially attached to the host server 14; hence, the routers 16 are used to terminate the serial lines 17 and send the bisync traffic over a common wide area network 20 along with the associated SNA and multi-protocol traffic. Hence, deployment of the system of FIG. 1 would require multiple external serial processors 22 coupled to the host server 14 for the respective deployed ATMs 12, limiting scalability and resulting in increased costs due to connecting multiple external serial processors 22 to the host server 14.

Newer automated teller machines are TCP/IP based and connect to a host server via an IP network 20, enabling the host server to communicate with the automated teller machines via a local area network and wide area network. However, such TCP/IP based ATMs lack management support, as found in legacy ATMs utilizing bisync protocol as illustrated above with respect to FIG. 1. In particular, the host server may be unable to determine connection status of a TCP/IP based ATM to determine, for example, whether the ATM utilizing TCP/IP connections needs user intervention.

SUMMARY OF THE INVENTION

There is a need for an arrangement that enables legacy ATMs utilizing bisync protocol to be implemented within an IP network, without the necessity of multiple respective serial connections at the host server.

There also is a need for an arrangement that enables bisync ATMs utilizing bisync protocol to communicate with a host computer coupled to a local area network, via Internet Protocol based routers configured for establishing a connection between the ATM and the host server, without the necessity of multiple serial connections.

There also is a need for an arrangement that enables a host computer to obtain management and status information, including connection status, from ATMs via an IP network, without the necessity of multiple serial connections for the host computer.

These and other needs are attained by the present invention, where a novel translation is used to enable the transport of bisync information from an automated banking device, for example an automated teller machine (ATM), to a host computer via an Internet Protocol network, without the necessity of providing a serial data stream to the host server for transport of bisync information. A router includes a serial interface configured for receiving a bisync serial data stream carrying Base-24 protocol data from the ATM. The router is configured for retrieving the Base-24 data from the bisync serial stream, and generating a new header that specifies attributes of the Base-24 message from the ATM; the Base-24 message and the corresponding new header are sent by the router to the host server according to Internet Protocol, enabling the host server to receive the Base-24 message and any associated status information based on the corresponding supplied header. The router also is configured for receiving via the data network an IP packet having a Base-24 message generated by the host server, and the associated header, and generating a bisync header based on the received header. The router can then output a new bisync frame having the generated bisync header and the Base-24 message generated by the host server, for the local ATM via the serial connection.

Hence, ATMs configured for outputting bisync frames carrying Base-24 data can be deployed in an IP network where the host server is coupled to a local area network, eliminating the necessity of multiple serial connections for the host server.

One aspect of the present invention provides a method in a router configured for establishing an Internet Protocol (IP) connection. The method includes receiving a bisync protocol data frame carrying bisync protocol fields and Base-24 protocol data from an automated banking device via a serial connection. The method also includes generating a new frame by generating a new header specifying attributes of the Base-24 protocol data and the automated banking device, removing the bisync header, and adding the new header to the Base-24 protocol data, and outputting the new frame, having the new header and the Base-24 protocol data, to an identified host server via the IP connection.

Another aspect of the present invention provides a router configured for establishing an Internet Protocol (IP) connection. The router includes a serial interface, a bisync to IP resource, and an IP interface. The serial interface is configured for receiving a bisync protocol data frame carrying bisync protocol data fields and Base-24 protocol data from an automated banking device via a serial connection. The bisync to IP resource is configured for generating a new frame by generating a new header specifying attributes of the Base-24 protocol data and the automated banking device, removing the bisync header, and adding the new header to the Base-24 protocol data. The Internet Protocol (IP) interface is configured for outputting the new frame, having the new header and the Base-24 protocol data, to an identified host server via the IP connection.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
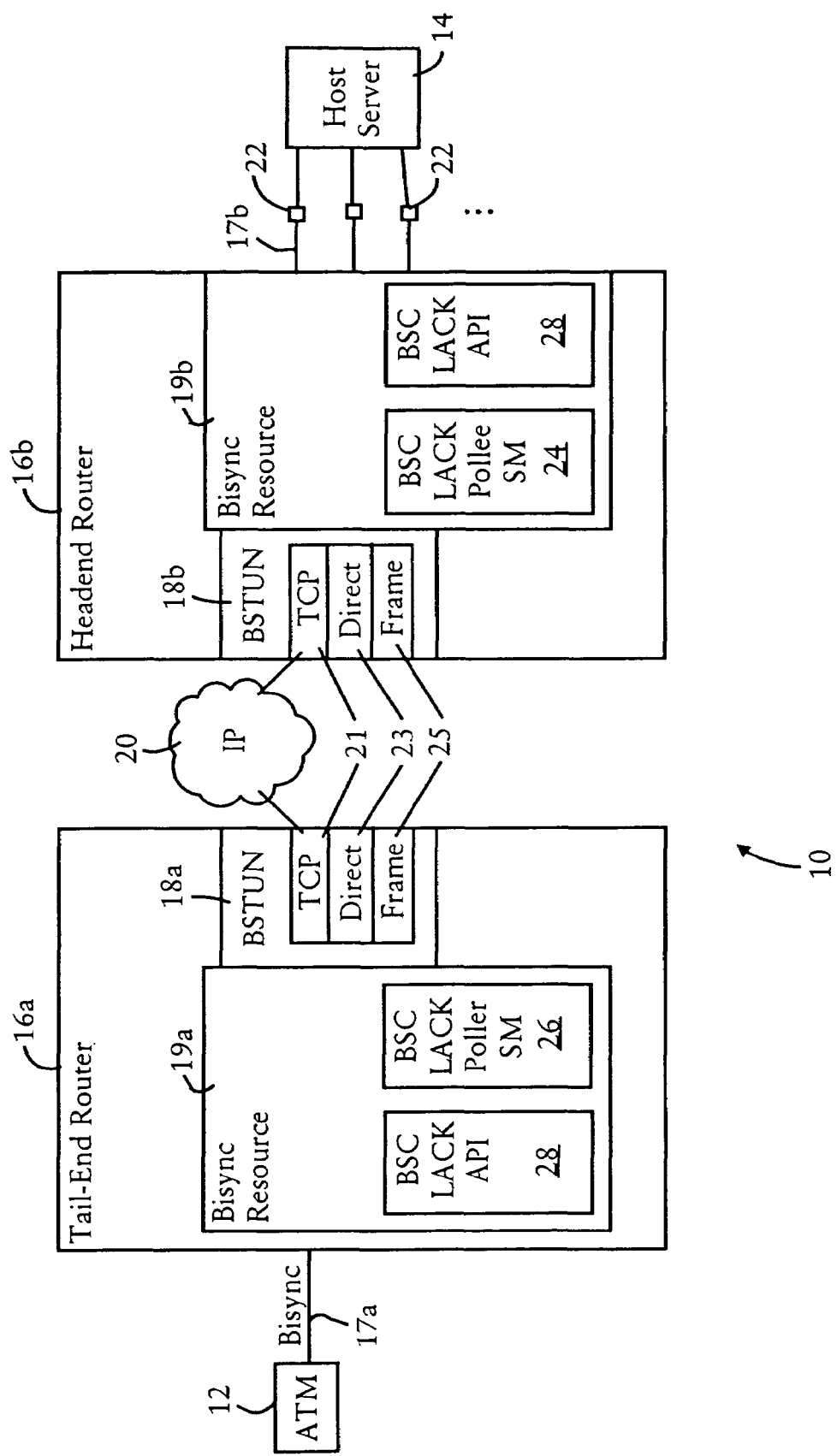
FIG. 1 is a diagram illustrating a conventional (Prior Art) arrangement for transporting ATM data via an IP network.
Figure 2:
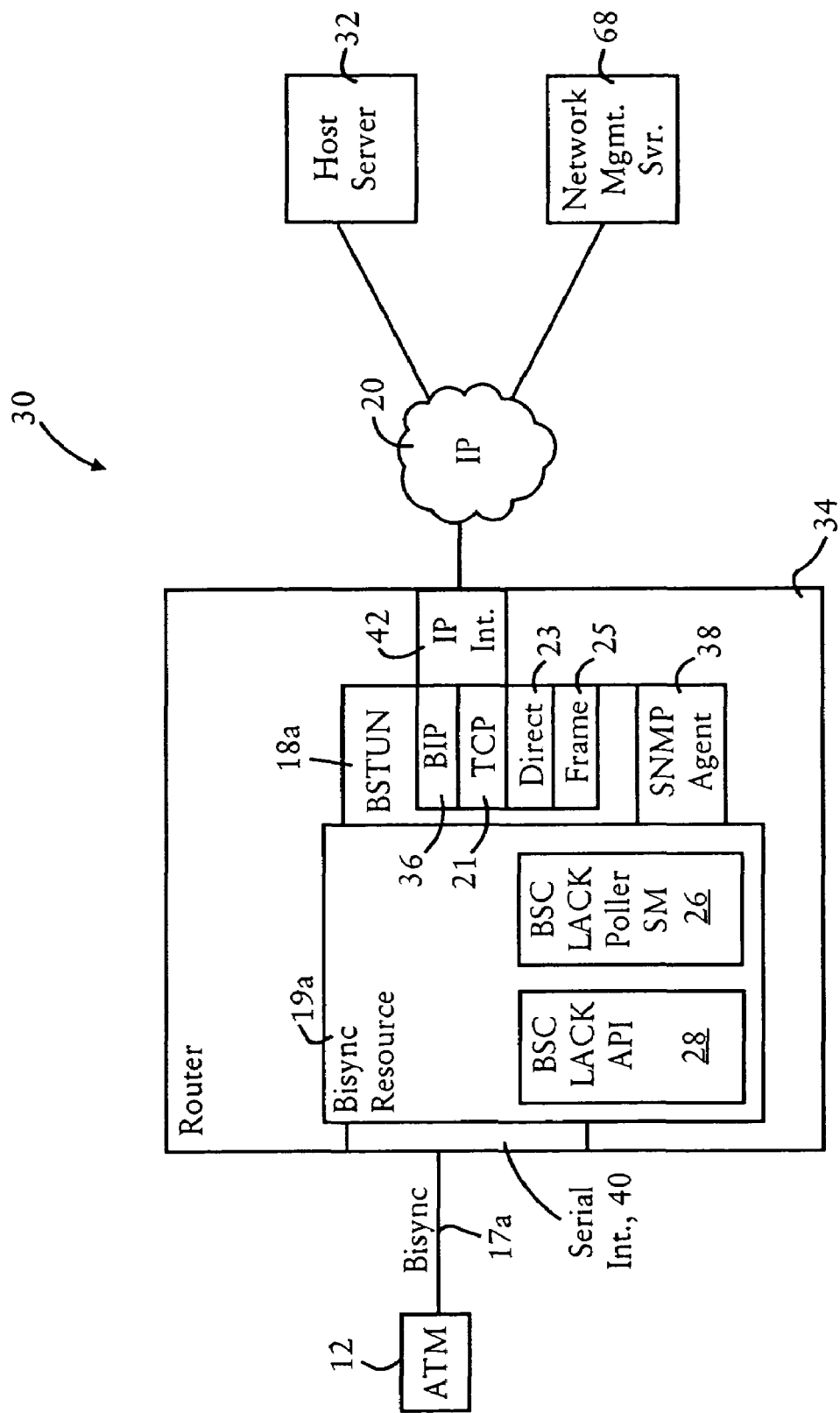
FIG. 2 is a diagram illustrating an arrangement for transporting ATM data via an IP network based on converting the bisync frames to IP frames, according to an embodiment of the present invention.

FIG. 2 is a block diagram illustrating a system 30 for passing Base-24 data between an automated banking device (e.g., an ATM 12) and a host server 32 via an IP network 20 according to TCP/IP protocol, according to an embodiment of the present invention. The automated banking device, although implemented as an ATM, also may be implemented as any electronic banking device, for example a kiosk, a smart phone, or any other point of sale device providing electronic funds services. The host server 32, for example a NonStop™ Himalaya™ server commercially available from Compaq Computer Corporation, is configured for sending and receiving Base-24 frames having a new header, described below, prepended to the Base-24 data prior to transport across the IP network 20 according to TCP/IP protocol.

The system 30 also includes a router 34, for example a commercially available Cisco 1700, 2600, 3600, and/or 7200 series router from Cisco Systems, San Jose, Calif. Note that other commercially available routers may be utilized. The router 34 is configured for supporting automated banking devices 12 that utilize the bisync (BSC) data link protocol. According to the disclosed embodiment, the router 34 is implemented by modifying the existing router 16a by adding a bisync to IP (BIP) resource 36, and configuring a Simple Network Management Protocol (SNMP) agent 38 to send messages to a network management server 68, based on a detected change in the status of the ATM 12 or the IP connection between the router 34 and the host server 32. The bisync to IP resource 36 is configured for converting between a bisync frame 50 received from a serial interface 40, and an IP packet 52 transported by the IP interface 42 onto the IP network 20.

Figure 3:
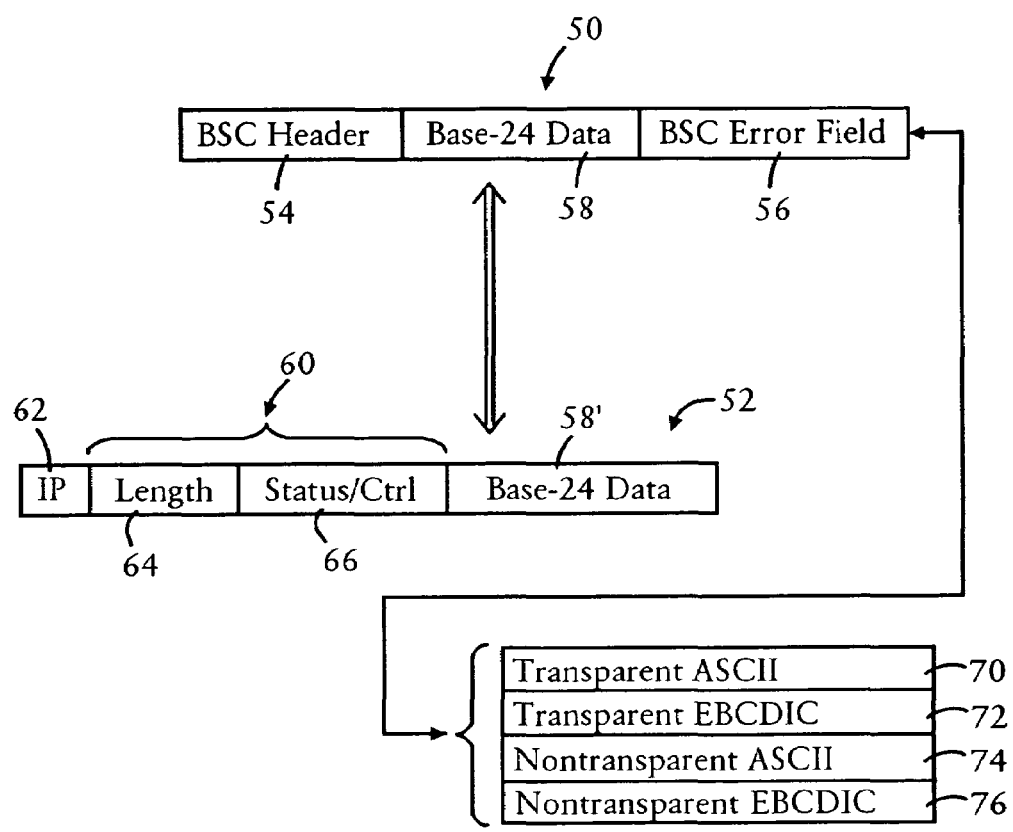
FIG. 3 is a diagram illustrating the conversion by the router of FIG. 2 between a bisync frame and an IP frame.

As illustrated with respect to FIG. 3, the bisync to IP resource 36 is configured for generating a new IP frame 52 from a bisync protocol data frame 50 received from the automated banking device 12 via the serial connection 17a and the serial interface 40. In particular, the bisync to IP resource 36 strips all bisync related information, including the bisync header 54 and error correction fields 56, in order to retrieve the raw base 24 protocol data 58. The bisync to IP resource 36 generates the new IP frame 52 by generating a new header 60, prepending the header 60 to the base 24 data 58', and prepending an IP header 62 having a prescribed destination IP address and a prescribed destination TCP port based on prescribed configuration settings to reach the host server 32. As described below, the base 24 data 58 in the bisync protocol data frame 50 may have a different format (e.g., EBCDIC) than the ASCII format of the base 24 data 58' in the IP frame 52.

According to the disclosed embodiment, the bisync to IP resource 36 generates, as a new header 60, a four-byte header having a two byte length field 64, and a two byte status/control field 66. The length field 64 specifies the length of the Base-24 data 58', and the status/control field 66 specifies prescribed attributes of the automated banking device 12 having generated the Base-24 protocol data 58'. For example, the status/control field 66 includes control bits that specify whether the attached bisync device 12 has a status of "OK", active, inactive, busy, or exited busy. The status/control field 66 also includes status bits that specify if the attached device has generated any of the following conditions: command rejected, intervention required, equipment check, data check, or operation check. Hence, the generation of the status/control field 66 enables the host server 32, upon reception of the IP frame 52 via the IP network 20, to monitor any changes in the status of the automated banking device 12.

The bisync to IP resource 36 also is configured for converting an IP frame 52 received via the IP interface 42 from the IP network 20, into a new bisync protocol data frame 50 for transmission to the automated banking device 12 via the serial interface 40. Hence, the bisync to IP resource 36 provides two-way conversion between bisync protocol data frames 50 and IP protocol frames 52 carrying the Base-24 data.

In addition, the bisync to IP resource 36 is able to generate the appropriate BSC header 54 and error fields 56 based on the configuration setting of the data type and transparency. Note that the Base-24 data 58' transported across the IP tunnel will always be sent as ASCII text. Depending on the configuration of the data type, there may be a translation between ASCII and EBCDIC text when converting between the BSC frame 50 and the IP frame 52. Using the data type and the transparency configured, the Base-24 data 58 will be enclosed by the appropriate header and error field to create a BSC frame 50 that is one of the following frame types: a transparent ASCII format 70, a transparent EBCDIC format 72, a nontransparent ASCII format 74, or a nontransparent EBCDIC format 76. The "EBCDIC" format refers to the Extended Binary Coded Decimal Interchange Code developed by IBM as an 8-bit extension of the 4-bit binary coded decimal encoding of digits 0–9.

The router 34 also includes an SNMP agent 38 configured for generating "SNMP traps" in response to the bisync to IP resource 36 detecting one of the identified conditions during generation of the status/control field 66. As described below, the bisync to IP resource 36 may determine the conditions for the status/control field 66 based on the bisync header 54, responses to bisync local acknowledgment polls, described below, and/or a combination of both. As illustrated in FIG. 2, the SNMP agent 38 may send an SNMP message identifying the state of the automated banking device 12 to a network management server 68.

Hence, legacy-based automated banking devices 12 configured for sending and receiving bisync protocol data frames 50 can be deployed within an IP based network according to TCP/IP protocol, while maintaining the automated banking device status information to enable the host server 32 to perform management operations and determine the status of the automated banking device 12.

Figure 4:
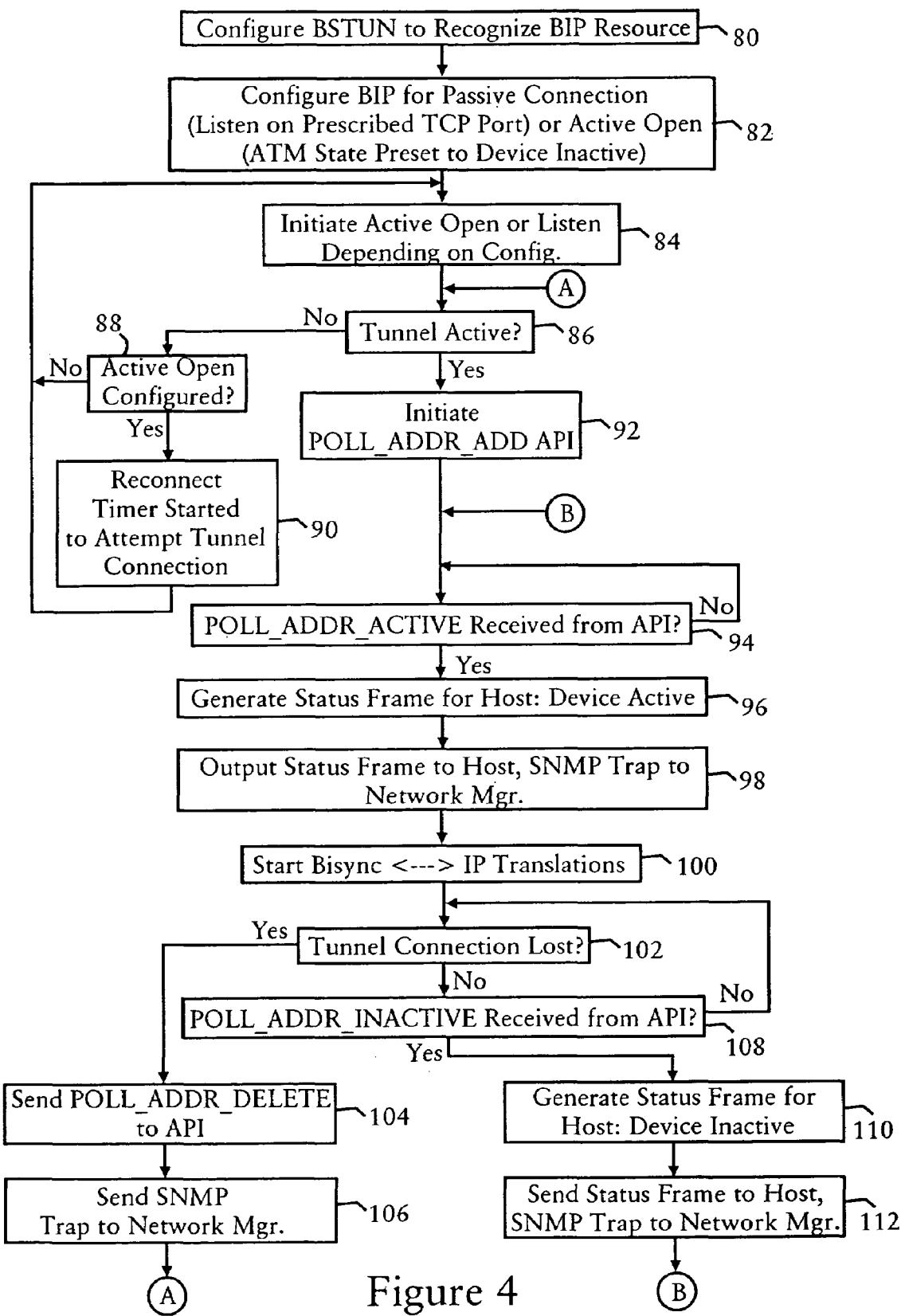
FIG. 4 is a diagram illustrating communications methods by the router of FIG. 2 for communications between the host server and the ATM via an IP network, according to an embodiment of the present invention.

FIG. 4 is a flow diagram illustrating the method of providing communications between the automated banking device 12 utilizing bisync protocol data frames 50, and the host server 32 configured for sending and receiving IP data frames 52, according to an embodiment of the present invention. The steps described in FIG. 4 can be implemented as executable code stored on a computer readable medium (e.g., a hard disk drive, a floppy drive, a random access memory, a read only memory, an EPROM, a compact disk, etc.).

The method begins in step 80, where the bisync tunneling resource 18*a* is configured to recognize the bisync to IP resource 36 as an alternative encapsulation type to the peer tunneling resources TCP/IP 21, direct connect 23, and frame relay 25. Hence, the BSTUN resource 18*a* is configured for identifying the bisync to IP resource 36 as an alternative encapsulation resource for transporting the data across the IP network 20, and will pass all messages received by the bisync resource 19*a* to the bisync to IP resource 36.

The host server 32 either configured either for active connections or passive listening for an incoming connection. In particular, the host server can be configured to establish a TCP connection (i.e., active connection) if it is desired that the host server 32 maintains manual control of the connection to the ATM 12 from the host server 32. The host server 32 also can be configured to listen for an incoming connection, enabling the router 34 to initiate the activation of the TCP connection, for example for an automatic recovery if the tunnel connection is lost. For an active connection, the host server 32 must use the router's listening port 1963 for the foreign port, and must have a unique local port to identify the connection between the automated banking device 12 and the host server 32. If configured to accept an incoming connection, a common local port will be used by the host server 32, for example port 2000, and a unique foreign port to identify the connection between the automated banking device 12 and the host server 32.

The bisync to IP resource 36 can be configured in step 82 to recognize passive connections initiated remotely by the host server 32, where the bisync to IP resource monitors (i.e., "listens") for incoming connections on a prescribed TCP port, for example port 1963. In this case, the foreign port on the "bstun route" statement must match the local port configured on the active open definition at the host server 32. Alternatively the bisync to IP resource 36 can be configured in step 82 to initiate an active open connection to the host server 32. In this case the foreign port on the "bstun route" statement will be set to the listening port for the host server 32 and the local port will be set to the unique value specified on the host server 32 for the foreign port which was used to identify the connection between the automated banking device 12 and the host server 32. The unique combination of foreign and local ports for active or passive connections enables the host server 32 to distinguish from multiple automated banking devices that may share the same router 32 having the same IP address, enabling the router 34 and the host server 32 to identify the correct TCP peer structure.

The bisync to IP resource 36 initiates in step 84 an active open, or a listen for connections, based on the above-described configurations.

If in step 86 the router determines that the IP tunnel is inactive due, for example, to a failure in a prior connection, then if in step 88 the router 34 is configured for performing an active open TCP connection to the host server 32, the router 34 initiates a reconnect timer in step 90 in an attempt to reconnect the tunnel between the router 34 and the host server 32 (e.g., a timer having a range of about 1 to 600 seconds with a default of 60 seconds). Depending on configuration, the bisync to IP resource 36 will either listen for an incoming connection or initiate an active open connection. Otherwise, the bisync to IP resource 36 takes no further action until the tunnel is active 25, in step 86.

Once the bisync to IP resource 36 determines in step 86 that the tunnel is active in step 86, the bisync to IP resource 36 sends in step 92 a request to the BSC local acknowledgment poller state machine 26 to send a Poll Address Add command (POLL_ADDR_ADD) to the bisync local acknowledgment API 28. In response to the bisync resource code 19a receiving a response from the automated banking device 12, the bisync resource 19 then returns to the bisync to IP resource 36 a Poll Address Active response (POLL_ADDR_ACTIVE) in step 94, indicating the ATM 12 is active and ready for data traffic. Note that the bisync to IP resource 36 may wait indefinitely for the Poll Address Active message.

Hence, if in step 94 the bisync to IP resource 36 detects the Poll Address Active message, the bisync to IP resource 36 generates in step 96 an IP frame having a header 60 (but no Base-24 data 58) with a Device Active Bit turned on within the status bits, and forwards the IP-based device active status frame in step 98 to the host server 32; the bisync to IP resource 34 also causes an SNMP message (e.g., an "SNMP trap") to be output to the network manager 68 indicating a change of status with the device active bit set. Hence, the IP-based device active status frames output in step 98 indicate that the ATM is active and ready for data traffic, enabling the bisync to IP resource to perform the above-described translations in step 100.

Assuming in step 102 that the router 34 determines that the tunnel connection is lost (e.g., TCP connection status based on "keepalive" messages), the bisync to IP resource 36 outputs in step 104 a request to the BSC local acknowledgment poller state machine 26 to send a Poll Address Delete command (POLL_ADDR_DELETE) to the bisync local acknowledgment API 28 to stop polling of the ATM 12. The bisync to IP resource 34 then causes in step 106 an SNMP message (e.g., an "SNMP trap") to be output to the network manager 68 to notify the network manager of the lost tunnel connection. Depending on configuration, re-establishment of the tunnel connection may be performed using the TCP open connect resource either by the host server 32, or the router 34.

Assuming in step 102 that the tunnel connection is maintained but that a Poll Address Inactive message (POLL_ADDR_INACTIVE) is received in step 108, indicating that the ATM 12 is not responding to poll requests, the bisync to IP resource generates in step 110 an IP frame having a header 60 (but no Base-24 data 58) with a Device Inactive bit value within the status bits, indicating that the ATM 12 is inactive and currently unable to receive data traffic. The bisync to IP resource 36 outputs in step 112 the Device Inactive status frame to the host server 34 via the IP tunnel, and causes an SNMP message to be sent to the network management server 68, indicating that the ATM 12 is inactive.

As apparent from the foregoing, various implementation methods may be used, depending on whether the bisync to IP resource 36 is configured as a separate peer structure for the bisync resource 19a.

According to the disclosed embodiment, automated banking devices configured for sending and receiving bisync protocol data frames can be deployed within an Internet Protocol based network for communication with a host server 32 connected via a local area network, for example Fast-Ethernet, based on translating the bisync protocol data frame into an IP frame having a new header specifying attributes of the Base-24 protocol data, and the automated banking device. Hence, a host server 32 can monitor the status of the automated banking device, and the TCP connection between the TCP peers.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a router configured for establishing an Internet Protocol (IP) connection, the method comprising:
receiving a bisync protocol data frame carrying bisync protocol fields and Base-24 protocol data from an automated banking device via a serial connection;
generating a new frame by generating a new header specifying attributes of the Base-24 protocol data and the automated banking device, removing the bisync header, and adding the new header to the Base-24 protocol data; and
outputting the new frame, having the new header and the Base-24 protocol data, to an identified host server via the IP connection.

2. The method of claim 1, further comprising:
second receiving via the IP connection a second frame having host-based Base-24 protocol data and a host-based header specifying attributes of the host-based Base-24 protocol data;
second generating a new bisync protocol data frame; and
second outputting the new bisync protocol data frame to the automated banking device via the serial connection.

3. The method of claim 2, wherein the second generating step includes generating new bisync protocol fields based on the host-based header, removing the host-based header, and adding the new bisync protocol fields to the host-based Base-24 protocol data.

4. The method of claim 3, wherein the step of generating new bisync protocol fields includes:
determining a transparency mode for the automated banking device and a data type; and
generating selected bisync data for the new bisync protocol fields based on the determined transparency mode and data type.

5. The method of claim 4, wherein the determining step includes:
first determining whether the transparency mode is one of transparent mode and non-transparent mode; and
second determining whether the data type is one of Ascii text and Extended Binary Coded Decimal Interchange Code (EBCDIC) text.

6. The method of claim 2, further comprising:
third receiving via the IP connection a third frame specifying a connection attempt for the identified host server via a prescribed Transmission Control Protocol (TCP) port;
outputting a poll request to the automated banking device via the serial connection;
determining whether a poll response is received via the serial connection from the automated banking device; and
generating and outputting via the IP connection a device active status frame, based on whether the poll response is received, indicating whether the host can send the second frame.

7. The method of claim 6, further comprising sending a message to the identified host server in response to determining an inactive status for the automated banking device.

8. The method of claim 1, wherein the generating step includes specifying status/sense information for the automated banking device within the new header.

9. The method of claim 8, further comprising sending a message, according to SNMP protocol, to a network management server that specifies the status/sense information for the automated banking device.

10. The method of claim 9, further comprising sending a second message, according to SNMP protocol, to the network management server based on a detected change in at least one of a status of the automated banking device, and a detected change in the IP connection.

11. The method of claim 1, wherein the generating includes prepending to the new header an IP header having a destination address field specifying a destination address for the identified host server.

12. A router configured for establishing an Internet Protocol (IP) connection, the router comprising:
 a serial interface configured for receiving a bisync protocol data frame carrying bisync protocol data fields and Base-24 protocol data from an automated banking device via a serial connection;
 a bisync to IP resource configured for generating a new frame by generating a new header specifying attributes of the Base-24 protocol data and the automated banking device, removing the bisync header, and adding the new header to the Base-24 protocol data; and
 an Internet Protocol (IP) interface configured for outputting the new frame, having the new header and the Base-24 protocol data, to an identified host server via the IP connection.

13. The router of claim 12, wherein the IP interface is configured for receiving via the IP connection a second frame having host-based Base-24 protocol data and a host-based header specifying attributes of the host-based Base-24 protocol data, the bisync to IP resource configured for generating a new bisync protocol data frame, the serial interface configured for outputting the new bisync protocol data frame to the automated banking device via the serial connection.

14. The router of claim 13, wherein the bisync to IP resource is configured for generating the new bisync protocol data frame by generating new bisync protocol fields based on the host-based header, removing the host-based header, and adding the new bisync protocol fields to the host-based Base-24 protocol data.

15. The router of claim 14, bisync to IP resource is configured for generating selected bisync data for the new bisync protocol fields based on determining a transparency mode for the automated banking device and a data type.

16. The router of claim 15, wherein the transparency mode is one of transparent mode and non-transparent mode, and the data type is one of Ascii text and Extended Binary Coded Decimal Interchange Code (EBCDIC) text.

17. The router of claim 13, further comprising a local acknowledgment poller state machine configured for:
 outputting a poll request, according to bisync protocol, in response to the IP interface receiving a third frame via the IP connection and specifying a connection attempt for the identified host server via a prescribed Transmission Control Protocol (TCP) port;
 determining whether a poll response is received via the serial connection from the automated banking device; and
 generating and outputting via the IP connection a device active status frame, based on whether the poll response is received, indicating whether the host can send the second frame.

18. The router of claim 17, further comprising an SNMP agent configured for sending a message to a network management server, according to SNMP protocol, in response to the local acknowledgment poller state machine determining an inactive status for the automated banking device.

19. The router of claim 12, wherein the bisync to IP resource is configured for specifying status/sense information for the automated banking device within the new header.

20. The router of claim 19, further comprising an SNMP agent configured for sending a message, according to SNMP protocol, to a network management server that specifies the status/sense information for the automated banking device.

21. The router of claim 20, wherein the SNMP agent is configured for sending a second message, according to SNMP protocol, to the network management server based on a detected change in at least one of a status of the automated banking device, and a detected change in the IP connection.

22. The router of claim 12, wherein the bisync to IP resource is configured for prepending to the new header an IP header having a destination address field specifying a destination address for the identified host server.

23. A computer readable medium having stored thereon sequences of instructions executable by a processor for establishing an Internet Protocol (IP) connection in a router, the sequences of instructions including instructions for performing the steps of:
 receiving a bisync protocol data frame carrying bisync protocol fields and Base-24 protocol data from an automated banking device via a serial connection;
 generating a new frame by generating a new header specifying attributes of the Base-24 protocol data and the automated banking device, removing the bisync header, and adding the new header to the Base-24 protocol data; and
 outputting the new frame, having the new header and the Base-24 protocol data, to an identified host server via the IP connection.

24. The medium of claim 23, further comprising instructions for performing the steps of:
 second receiving via the IP connection a second frame having host-based Base-24 protocol data and a host-based header specifying attributes of the host-based Base-24 protocol data;
 second generating a new bisync protocol data frame; and
 second outputting the new bisync protocol data frame to the automated banking device via the serial connection.

25. The medium of claim 24, wherein the second generating step includes generating new bisync protocol fields based on the host-based header, removing the host-based header, and adding the new bisync protocol fields to the host-based Base-24 protocol data.

26. The medium of claim 25, wherein the step of generating new bisync protocol fields includes:
 determining a transparency mode for the automated banking device and a data type; and
 generating selected bisync data for the new bisync protocol fields based on the determined transparency mode and data type.

27. The medium of claim 26, wherein the determining step includes:
 first determining whether the transparency mode is one of transparent mode and non-transparent mode; and second determining whether the data type is one of Ascii text and Extended Binary Coded Decimal Interchange Code (EBCDIC) text.

28. The medium of claim 24, further comprising instructions for performing the steps of:
third receiving via the IP connection a third frame specifying a connection attempt for the identified host server via a prescribed Transmission Control Protocol (TCP) port;
outputting a poll request to the automated banking device via the serial connection;
determining whether a poll response is received via the serial connection from the automated banking device; and
generating and outputting via the IP connection a device active status frame, based on whether the poll response is received, indicating whether the host can send the second frame.

29. The medium of claim 28, further comprising instructions for performing the step of sending a message to a network management server, according to SNMP protocol, in response to determining an inactive status for the automated banking device.

30. The medium of claim 23, wherein the generating step includes specifying status/sense information for the automated banking device within the new header.

31. The medium of claim 23, wherein the generating includes prepending to the new header an IP header having a destination address field specifying a destination address for the identified host server.

32. A router configured for establishing an Internet Protocol (IP) connection, the router comprising:
first means for receiving a bisync protocol data frame carrying bisync protocol fields and Base-24 protocol data from an automated banking device via a serial connection;
means for generating a new frame by generating a new header specifying attributes of the Base-24 protocol data and the automated banking device, removing the bisync header, and adding the new header to the Base-24 protocol data; and
second means for outputting the new frame, having the new header and the Base-24 protocol data, to an identified host server via the IP connection.

33. The router of claim 32, wherein:
the second means is configured for receiving via the IP connection a second frame having host-based Base-24 protocol data and a host-based header specifying attributes of the host-based Base-24 protocol data;
the generating means is configured for generating a new bisync protocol data frame; and
the first means is configured for outputting the new bisync protocol data frame to the automated banking device via the serial connection.

34. The router of claim 33, wherein the generating means is configured for generating new bisync protocol fields based on the host-based header, removing the host-based header, and adding the new bisync protocol fields to the host-based Base-24 protocol data.

35. The router of claim 34, wherein the generating means is configured for:
determining a transparency mode for the automated banking device and a data type; and
generating selected bisync data for the new bisync protocol fields based on the determined transparency mode and data type.

36. The router of claim 35, wherein the generating means is further configured for:
first determining whether the transparency mode is one of transparent mode and non-transparent mode; and
second determining whether the data type is one of Ascii text and Extended Binary Coded Decimal Interchange Code (EBCDIC) text.

37. The router of claim 33, wherein the second means is configured for receiving via the IP connection a third frame specifying a connection attempt by for the identified host server via a prescribed Transmission Control Protocol (TCP) port, the router further comprising:
polling means configured for outputting a poll request to the automated banking device via the serial connection, and determining whether a poll response is received via the serial connection from the automated banking device; and
means for generating and outputting via the IP connection a device active status frame, based on whether the poll response is received, indicating whether the host can send the second frame.

38. The router of claim 37, further comprising sending means configured for sending a message to a network management server, according to SNMP protocol, in response to determining an inactive status for the automated banking device.

39. The router of claim 32, wherein the generating means is configured for specifying status/sense information for the automated banking device within the new header.

40. The router of claim 32, wherein the means for generating is configured for prepending to the new header an IP header having a destination address field specifying a destination address for the identified host server.

* * * * *